(12) United States Patent
Yu et al.

(10) Patent No.: US 12,418,603 B2
(45) Date of Patent: Sep. 16, 2025

(54) ELECTRONIC DEVICE AND METHOD FOR MOUNTING SUPPORT MEMBER OF ELECTRONIC DEVICE

(71) Applicant: VIVO MOBILE COMMUNICATION CO., LTD., Guangdong (CN)

(72) Inventors: Changguo Yu, Guangdong (CN); Ximing Liu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 378 days.

(21) Appl. No.: 18/321,972

(22) Filed: May 23, 2023

(65) Prior Publication Data

US 2023/0300229 A1 Sep. 21, 2023

Related U.S. Application Data

(63) Continuation of application No. PCT/CN2021/132701, filed on Nov. 24, 2021.

(30) Foreign Application Priority Data

Nov. 30, 2020 (CN) .......................... 202011373360.8

(51) Int. Cl.
    *H04M 1/02* (2006.01)
(52) U.S. Cl.
    CPC ................. *H04M 1/0264* (2013.01)

(58) Field of Classification Search
    CPC .......................... H04M 1/0264; H04M 1/0249
    See application file for complete search history.

(56) References Cited

U.S. PATENT DOCUMENTS

2019/0268511 A1   8/2019  Wang et al.
2022/0053076 A1*  2/2022  Nguyen Van ....... H04M 1/0264

FOREIGN PATENT DOCUMENTS

| CN | 108366329 A | 8/2018 |
|---|---|---|
| CN | 110032024 A | 7/2019 |
| CN | 110278363 A | 9/2019 |
| CN | 111970422 A | 11/2020 |
| CN | 112468624 A | 3/2021 |

* cited by examiner

*Primary Examiner* — Christopher M Brandt
(74) *Attorney, Agent, or Firm* — Price Heneveld LLP

(57) ABSTRACT

This application discloses an electronic device, including a main board support, a main board upper-cover, a first camera, a second camera, and a support member. A cavity is formed between the main board support and the main board upper-cover, and the first camera and the second camera are disposed in the cavity and form a gap. The main board upper-cover has a first support part, the first support part is located between the first camera and the second camera and extends towards the gap. The support member is connected to the main board support, and at least a part, away from the main board support, of the support member, is made of a shape memory alloy and is deformable between a first shape and a second shape.

20 Claims, 4 Drawing Sheets

ELECTRONIC DEVICE AND METHOD FOR MOUNTING SUPPORT MEMBER OF ELECTRONIC DEVICE

This application is a continuation application of PCT Application No. PCT/CN2021/132701 filed on Nov. 24, 2021, which claims priority to Chinese Patent Application No. 202011373360.8, filed with the China National Intellectual Property Administration on Nov. 30, 2020 and entitled "ELECTRONIC DEVICE AND METHOD FOR MOUNTING SUPPORT MEMBER OF ELECTRONIC DEVICE", the disclosures of which are incorporated herein by reference in their entireties.

TECHNICAL FIELD

This application relates to the technical field of communication devices, and in particular to an electronic device and a method for mounting a support member of the electronic device.

BACKGROUND

Some electronic devices (such as mobile phones and tablet computers) in the market are well received by consumers, and generally have front photographing functions. To achieve more better self-timer functions and better effects of front cameras, two front cameras (namely, a front main camera and a front wide-angle camera) are required to be used in the front of an electronic device, thereby leading to formation of a notch screen. To reduce a length of the notch screen and improve an optimal effect of a front appearance of the electronic device, a gap between the two front cameras is required to be minimized. Therefore, it is difficult to dispose a support structure between the two front cameras. However, if there is no support structure between the two front cameras, a reliability test of mobile phone roll drop tester will easily cause transmission of an impact force to the front cameras. This will lead to a failure of a function of the two front cameras and even damage to the electronic device.

SUMMARY

According to a first aspect of this application, an embodiment of this application discloses an electronic device, including a main board support, a main board upper-cover, a first camera, and a second camera.

A cavity is enclosed between the main board support and the main board upper-cover, the first camera and the second camera are both disposed in the cavity, and a gap is formed between the first camera and the second camera.

The main board upper-cover has a first support part, the first support part is located between the first camera and the second camera and extends towards the gap.

The electronic device further includes a support member. The support member is connected to the main board support. At least a part, away from the main board support, of the support member is made of a shape memory alloy. At least the part, away from the main board support, of the support member is deformable between a first shape and a second shape. In the first shape, at least the part, away from the main board support, of the support member is located in the gap. In the second shape, at least the part, away from the main board support, of the support member forms a second support part. The second support part abuts against the first support part. In addition, along a distribution direction of the first camera and the second camera, a size of the second support part is larger than that of the gap.

According to a second aspect, an embodiment of this application discloses a method for mounting the support member in the electronic device. The method includes:
   fastening the support member to the main board support;
   cooling the support member to a first preset temperature, so that a support region of the support member is in a flat shape;
   assembling the main board support to the main board upper-cover, and extending the support region of the support member into the gap; and
   heating the support member to a second preset temperature, so that the support region of the support member is deformed to form the second support part, and the second support part abuts against the first support part.

BRIEF DESCRIPTION OF DRAWINGS

The accompanying drawings described herein are intended to provide a further understanding of this application, and constitute a part of this application. Example embodiments of this application and descriptions thereof are intended to describe this application, and do not constitute limitations on this application. In the accompanying drawings.

Figure 1:
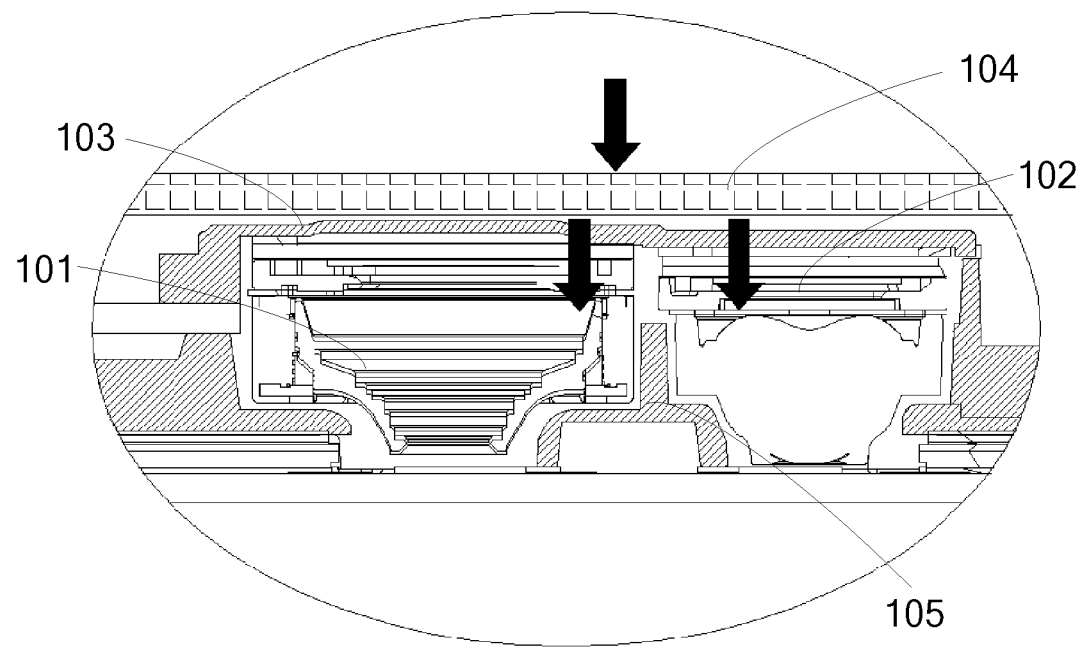
FIG. 1 is a partial schematic view of a front camera of an electronic device disclosed in related technologies.
Figure 2:
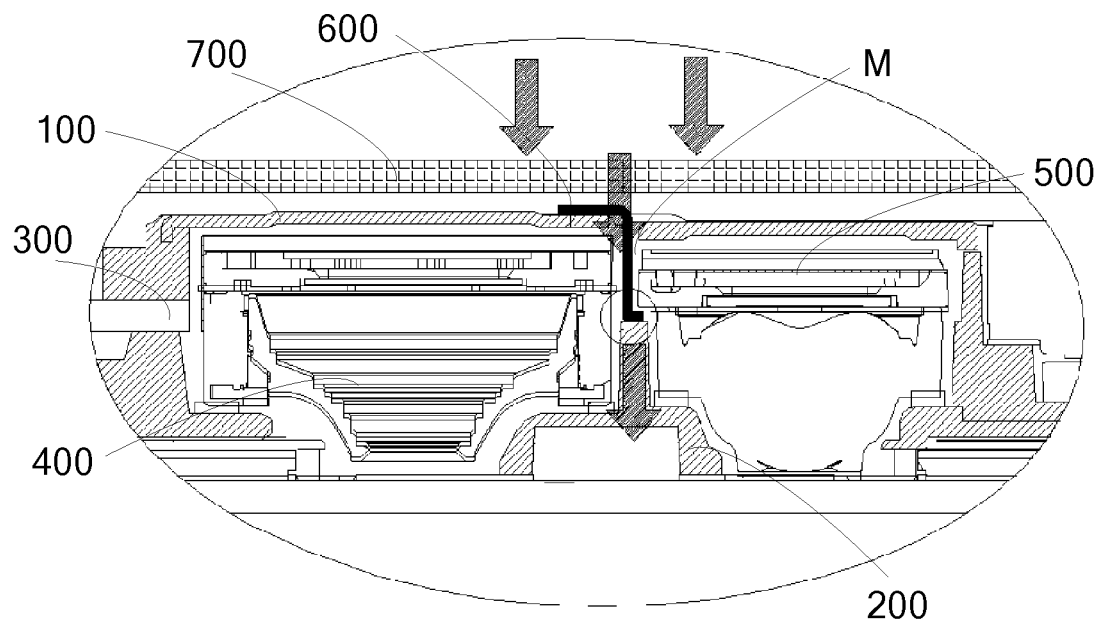
FIG. 2 is a partial schematic diagram of a front camera module of an electronic device disclosed according to an embodiment of this application.

Reference numerals in the accompanying drawings are as follows:
   100—main board support; 110—positioning protrusion; 120—through hole;
   200—main board upper-cover; 210—first support part; 220—third support part; 230—fourth support part;
   300—main board;
   400—first camera;
   500—second camera;
   600—support member; 610—fastened plate; 611—positioning hole; 620—support plate; 630—second support part;
   700—battery cover;

M—gap.

DESCRIPTION OF EMBODIMENTS

To make the objectives, technical solutions, and advantages of this application clearer, the following clearly and completely describes the technical solutions of this application with reference to the specific embodiments of this application and the corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

Layout of two front cameras in an electronic device in related technologies is shown in FIG. 1. 101 is a front main camera with high pixels, and is mainly responsible for a front photographing function. 102 is a front wide-angle camera, and is mainly responsible for a super-large wide-angle photographing function to satisfy more user requirements. To minimize a length of a notch screen and improve an optimal effect of a front appearance, a gap between the two front cameras is required to be minimized. As can be seen from FIG. 1, a gap between the front main camera and the front wide-angle camera is relatively small. 103 is a main board support configured to support and protect two front cameras. In FIG. 1, a left support of the main board support 103 is on a main board, and a right support is on a main board upper-cover 105. However, due to a relatively small gap between the two front cameras, a support structure cannot be disposed. 104 is a plate-shaped battery cover with weak strength and is easy to deform, and is pasted on a main board lower-cover. 105 is the main board upper-cover, and is configured to fasten the two front cameras and support the main board, the main board support, and the main board lower-cover.

Based on the foregoing disposing, when the plate battery cover 104 is subject to an external force, the plate battery cover 104 is greatly deformed due to weak strength of the plate battery cover, so that the force is directly transmitted to the main board support 103. Because a support structure cannot be disposed between the two front cameras, the main board support 103 can transmit the force only to the two front cameras. Accordingly, the two front cameras are deformed under the force, leading to a sharp increase in a risk of cracking of a photosensitive chip and filter, further leading to a failure of normal working of the two front cameras.

To resolve the foregoing technical problem, the inventor proposes a technical solution in this application. The technical solutions disclosed in embodiments of this application are described in detail below with reference to the accompanying drawings.

Referring to FIG. 2 to FIG. 8, embodiments of this application disclose an electronic device. The disclosed electronic device includes a main board support 100, a main board upper-cover 200, a first camera 400, a second camera 500, and a support member 600.

The main board support 100 is a basic member of the electronic device, and the main board support 100 can provide a mounting foundation for some members in the electronic device. In an embodiment of this application, the first camera 400 and the second camera 500 are both disposed inside the main board support 100. The first camera 400 and the second camera 500 are supported and protected by using the main board support 100.

The main board upper-cover 200 is a fastening member of the electronic device, and the main board upper-cover 200 can be configured to fasten and support some members. In an embodiment of this application, the main board upper-cover 200 is configured to fasten the first camera 400 and the second camera 500, and to support a main board 300, the main board support 100, and a main board lower-cover.

In some embodiments, one side of the main board support 100 is supported on the main board 300 of the electronic device, while the main board 300 is supported on the main board upper-cover 200, and the other side of the main board support 100 is directly supported on the main board upper-cover 200. In this way, a cavity is formed between the main board support 100 and the main board upper-cover 200. The first camera 400 and the second camera 500 are disposed in parallel in the cavity, to mount and fasten the two cameras through the main board support 100 and the main board upper-cover 200.

Further, the main board upper-cover 200 has a first support part 210. The first support part 210 extends into the cavity and divides the cavity into two small cavities. The first camera 400 is embedded into one of the small cavities, and the second camera 500 is embedded in the other of the small cavities, to mount and fasten the two cameras through the two small cavities. In some embodiments, the first camera 400 is a front main camera with high pixels, and is mainly responsible for a front photographing function. The second camera 500 is a front wide-angle camera, and is responsible for a super-large wide-angle photographing function, to satisfy more photographing requirements of a user. In addition, a gap M is formed between the first camera 400 and the second camera 500.

To alleviate damage to a camera module due to a force exerted on one side of the main board support 100, the support member 600 is connected to the main board support 100. At least a part, away from the main board support 100, of the support member 600, is made of a shape memory alloy, and at least a part, away from the main board support 100, of the support member 600, is deformable between a first shape and a second shape. In the first shape, at least a part, away from the main board support 100, of the support member 600 can extend into the gap M. In the second shape, at least a part, away from the main board support 100, of the support member 600 forms a second support part 630. The second support part 630 abuts against the first support part 210 of the main board support 100. In addition, along a distribution direction of the first camera 400 and the second camera 500, a size of the second support part 630 is larger than that of the gap M. Therefore, support between the main board support 100 and the main board upper-cover 200 is implemented by the support member 600, which can effectively resolve a problem of damage to a camera module due to a force exerted on a central region of the main board support 100.

At least a part, away from the main board support 100, of the support member 600, is made of the shape memory alloy. The shape memory alloy is an alloy through martensitic phase transformation with regular atomic arrangement and a volume change less than 0.5%. This alloy will deform under the action of an external force. When the external force is removed, the alloy can restore to an original shape of the alloy at a temperature. Because this alloy has more than one million times of restoration functions, this alloy is called a "memory alloy" or "shape memory alloy", that is, the shape memory alloy. The shape memory alloy has advantages of non-magnetism, wear resistance, corrosion resistance, and non-toxicity, and has been widely used. At present, the shape memory alloy has been widely used in electronic instruments, an automobile industry, medical instruments, space technologies, energy development, and other fields, such as making temperature control devices, temperature control circuits, and aircraft aerial refueling interfaces. At present, dozens of alloys with different memory functions have been found, including a nickel-titanium alloy, gold-cadmium alloy, copper-zinc alloy, and the like.

The shape memory alloy (SMA) is an alloy material that can completely eliminate deformation of the shape memory alloy at lower temperature after heated, and restore to an original shape before deformation, that is, an alloy with a "memory" effect. The shape memory alloy is widely used in an aerospace field. For example, huge antennas on an artificial satellite may be made of the shape memory alloy. Before the artificial satellite is launched, a parabolic antenna is folded and put into the artificial satellite. After a rocket is launched and transports the artificial satellite to a predetermined orbit, the antenna needs to be heated only. The folded antenna for the satellite is naturally unfolded because of a "memory" function, and restore to a shape of parabolic surface. For example, a bent shape memory alloy spoon will straighten when placed in hot water, and bend again when placed in cold water.

Figure 3:
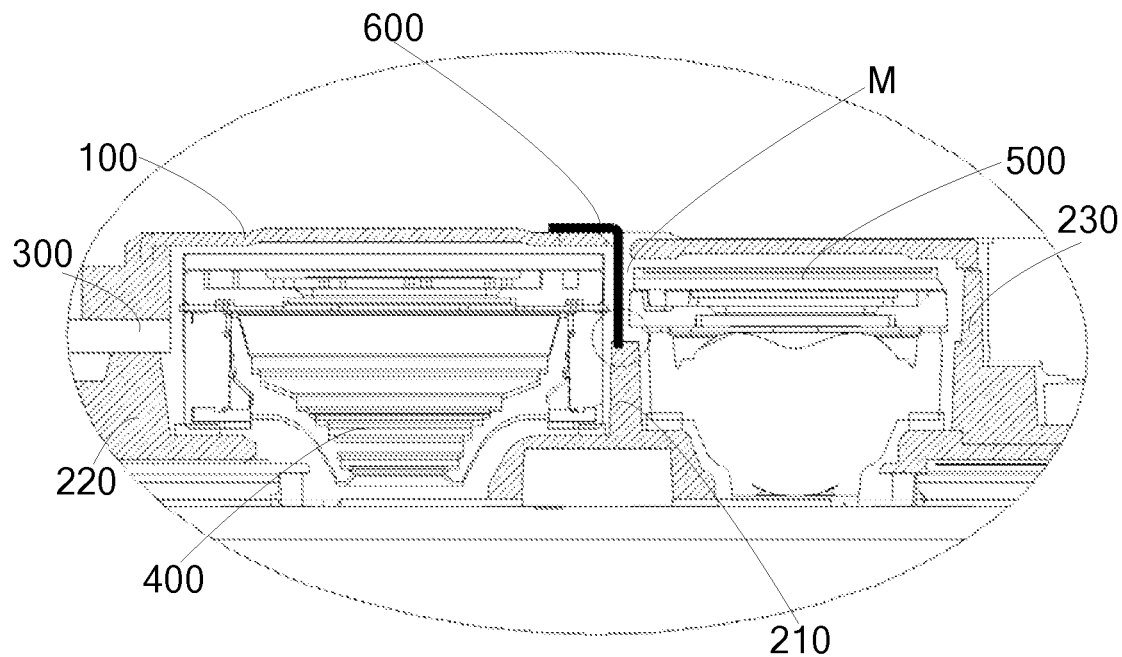
FIG. 3 is a partial schematic diagram of a front camera module when a support member in an electronic device is in a first shape disclosed according to an embodiment of this application.
Figure 4:
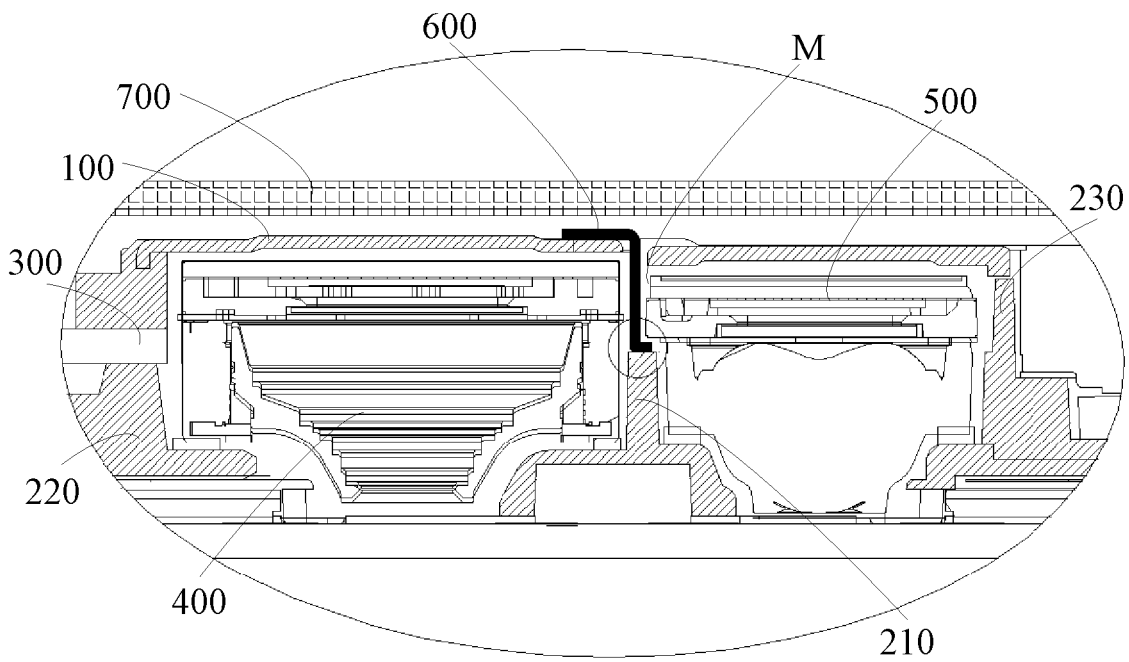
FIG. 4 is a partial schematic diagram of a front camera module when a support member in an electronic device is in a second shape disclosed according to an embodiment of this application.

It can be known, based on a characteristic of the shape memory alloy, as shown in FIG. 3, that the support member 600 is in a first shape at low temperature. In this shape, the support member 600 can penetrate into the gap M and extend toward the first support part 210. This can ensure that the support member 600 can smoothly penetrate into the gap M without colliding with a side wall of the first camera 400 or a side wall of the second camera 500, achieving a good assembly effect. As shown in FIG. 4, at relatively high temperature, the support member 600 is partially deformed to be in a second shape. That is, the second support part 630 is formed at one end, away from the main board support 100, of the support member 600. In addition, along a distribution direction of the first camera 400 and the second camera 500, a size of the second support part 630 is larger than that of the gap M between the first camera 400 and the second camera 500. In this way, when the second support part 630 abuts against the first support part 210 of the main board upper-cover 200, a contact area between the support part 600 and the first support part 210 is increased. In addition, a size of the support part 600 changes to a certain extent due to local deformation, so that a tolerance formed by connection between the support part 600 and the main board support 100 and a tolerance formed by assembly between the main board support 100 and the main board upper-cover 200 can be eliminated effectively, further greatly improving a support effect of the support part 600.

In the electronic device disclosed in the embodiments of this application, to reduce a length of a notch screen, the gap M between the first camera 400 and the second camera 500 is relatively small. In this case, the support member 600 is in the first shape and can smoothly penetrate into the gap M. After the support member 600 penetrates into the gap M, the support member 600 is partially deformed to form the second support part 630 to be in the second shape. In this case, the support member 600 abuts against the first support part 210 through the second support part 630, increasing a support area and achieving a good support effect.

It should be noted that the gap M between the first camera 400 and the second camera 500 can be penetrated only by the support member 600 in the first shape, but not by the support member 600 in the second shape. That is, along the distribution direction of the first camera 400 and the second camera 500, the size of the support member 600 in the first shape is not larger the size of the gap M, and the size of the support member 600 in the second shape is larger than the size of the gap M. In addition, the support member 600 may be made of the shape memory alloy as a whole, a part, extending into the gap M, of the support member 600, may be made of the shape memory alloy, or a part, configured to abut against the first support part 210, of the support member 600 may be made of the shape memory alloy. Deformation of the support member 600 is determined according to several times of cold and hot cycle training. For a specific principle, refer to related technologies. Details are not described herein.

In a specific implementation, refer to FIG. 5 to FIG. 8. A support member 600 is made of sheet metal stamping parts, and in some embodiments includes a fastened plate 610 and a support plate 620. The fastened plate 610 and support plate 620 are integrally disposed or connected with each other. An angle is provided between the fastened plate 610 and support plate 620. The fastened plate 610 is connected to a main board support 100 in a fastening manner, a second support part 630 is located at one end, away from the fastened plate 610, of the support plate 620. In some embodiments, the fastened plate 610 may be directly welded to the main board support 100, for example, the fastened plate 610 and the main board support 100 are welded together by spot welding. Definitely, in consideration of welding accuracy, welding firmness, welding efficiency improvement, and the like, a positioning protrusion 110 may be disposed on a side, away from a main board upper-cover 200, of the main board support 100. A shape of the positioning protrusion 110 may be optional, such as cylindrical, prismatic, or hemispherical. Correspondingly, a positioning hole 611 is provided in the fastened plate 610. A shape of the positioning hole 611 is adapted to the positioning protrusion 110. In this manner, when the fastened plate 610 is mounted, first, the positioning hole 611 in the fastened plate 610 are sleeved on the positioning protrusion 110 on the main board support 100. Then, the fastened plate is fastened by spot welding. In addition, a quantity of the positioning protrusions 110 may be arbitrary as long actual requirements are satisfied, and is not In some embodiments limited herein.

The support plate 620 may be connected, in a fastening manner, to the fastened plate 610 by spot welding, and an angle is provided between the support plate 620 and the fastened plate 610. Because a longitudinal extension direction of a gap M is opposite to or approximately perpendicular to the main board support 100, when the fastened plate 610 is welded and fastened to the main board support 100, to enable the support plate 620 to penetrate into the gap M, the support plate 620 and the fastened plate 610 are designed to be perpendicular to each other. In this way, fastened connection between the fastened plate 610 and the main board support 100 can be ensured, and the support plate 620 can smoothly penetrate into the gap M without touching a side wall of the two front cameras. Further, the fastened plate 610 is an L-shaped plate. The support plate 620 is connected to one outer side edge of the L-shaped plate in a fastening manner, and the support plate 620 and the fastened plate 610 are perpendicular to each other.

The second support part 630 is located at one end, away from the fastened plate 610, of the support plate 620. When the main board support 100 is assembled with the main board upper-cover 200, the support plate 620 is partially located in the gap M, and an end, away from the fastened plate 610, of the support plate 620, is deformed to form the second support part 630. The second support part 630 supports on a first support part 210 of the main board upper-cover 200. Therefore, a contact area is increased, and a good supporting effect on a middle region of the main board support 100 is ensured.

A shape memory alloy may be divided into the following categories.

A first category: a one-way memory effect: a shape memory alloy is deformed at relatively low temperature and can restore to a shape before deformation after heated. This shape memory phenomenon existing only during heating is called the one-way memory effect.

A second category: a two-way memory effect: a shape memory alloy can restore to a shape for a high-temperature phase when heated, and can recover a shape for a low-temperature phase when cooled, which is called the two-way memory effect.

A third category: a whole-course memory effect: a shape memory alloy can restore to a shape for a high-temperature phase when heated, and become a shape for a low-temperature phase with a same shape but opposite orientations when cooled, which is called the whole-course memory effect.

Figure 7:
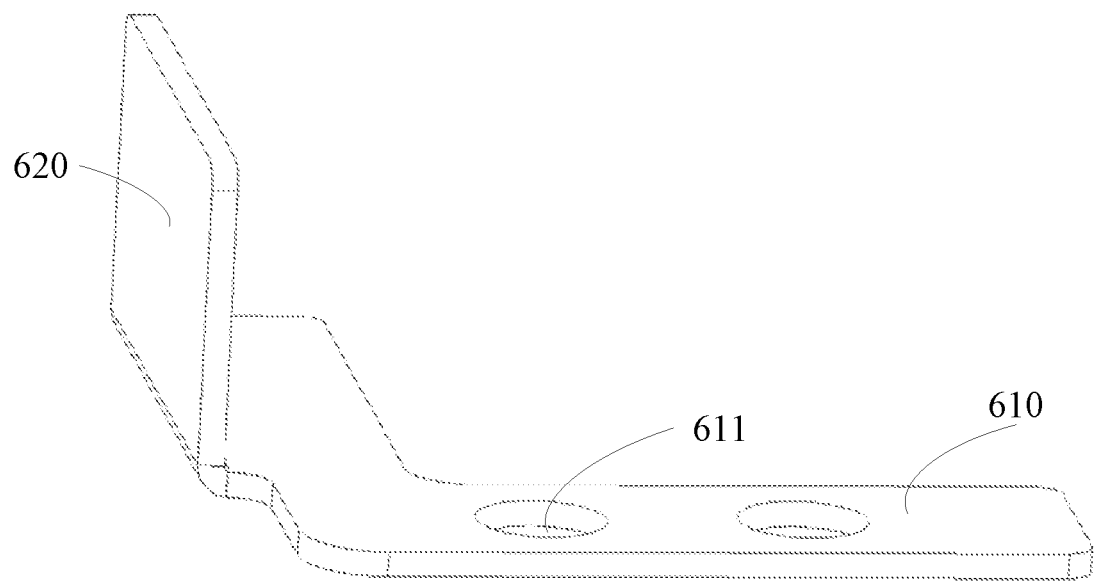
FIG. 7 is a schematic diagram of a support member in a first shape in an electronic device disclosed according to an embodiment of this application.
Figure 8:
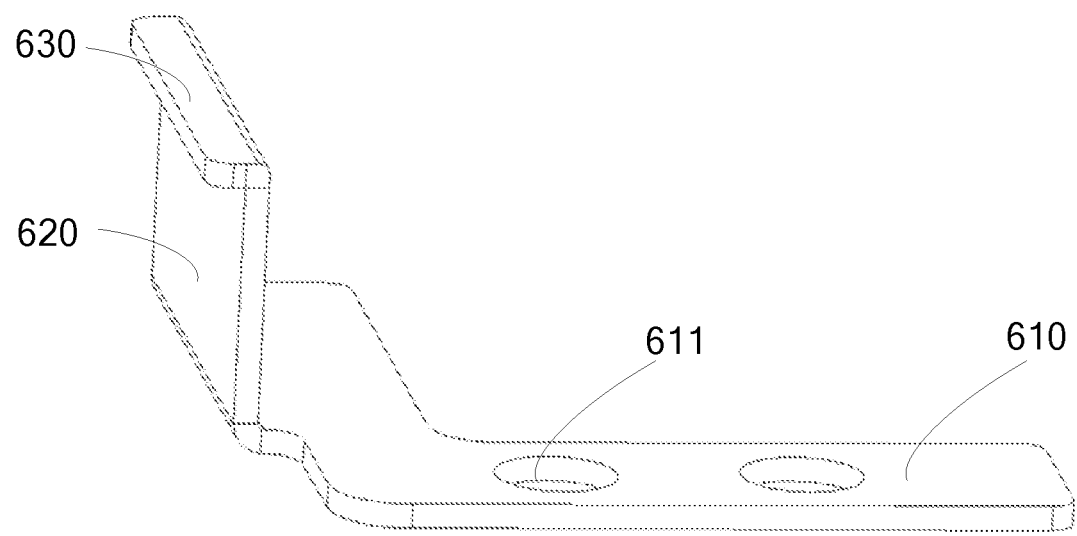
FIG. 8 is a schematic diagram of a support member in a second shape in an electronic device disclosed according to an embodiment of this application.

In an embodiment of this application, the support member 600 is made of the shape memory alloy with the two-way memory effect. This type of shape memory alloy can restore to the shape for the high-temperature phase when heated and the shape for the low-temperature phase when cooled. In some embodiments, when the support plate 620 is at low temperature, according to a characteristic of the shape memory alloy, the support plate 620 is in the shape for a low-temperature phase, and the support plate 620 is in a flat shape (that is, the foregoing first shape). As shown in FIG. 7, when the main board support 100 is assembled to the main board upper-cover 200, the support plate 620 in the flat shape can smoothly penetrate into the gap M between the first camera 400 and the second camera 500. Accordingly, the support plate 620 is effectively prevented from colliding with a side wall of the first camera 400 or a side wall of the second camera 500 during penetration, and a good assembly effect is further achieved. When the support plate 620 is at high temperature, based on the characteristic of the shape memory alloy, the support plate 620 is deformed and bent to form a flange edge (that is, the foregoing second shape), as shown in FIG. 8. In this case, because the support plate 620 is bent to one side to form the flange edge, when the flange edge abuts against the first support part 210, a contact area with the first support part 210 can be greatly increased. In addition, because local bending of the support plate 620 can eliminate a tolerance of the whole support member 600 for connecting to the main board support 100, a support effect between the support member 600 and the first support part 210 of the main board upper-cover 200 is improved, ensuring support stability. Further, the support plate 620 is bent into the L shape, to increase the contact area with the first support part 210.

It should be noted that no functional and appearance problem occurs on a whole electronic device, such as a mobile phone at a temperature of −30° C. to 80° C. Therefore, a temperature for phase transformation of the shape memory alloy should be controlled between −30° C. and 80° C., including −30° C., −10° C., 0° C., 20° C., 40° C., 60° C., 80 C, and the like. Understandably, the temperature may further include another degree, which is not limited herein. Based on the foregoing temperature range for phase transformation, a nickel-titanium shape memory alloy may be selected as the shape memory alloy. A temperature for a low-temperature phase of the nickel-titanium shape memory alloy is about −15° C., and a temperature for a high-temperature phase of the nickel-titanium shape memory alloy is 30° C. to 55° C., which satisfies actual requirements. Definitely, the shape memory alloy is not limited to the nickel-titanium memory alloy, but may be other shape memory alloys that satisfy practical requirements.

In a specific implementation, still refer to FIG. 7 and FIG. 8. The support plate 620 is in a flat shape at low temperature. In this case, the support plate 620 has a flat plate structure, and the support plate 620 is deformed at high temperature, to form a flange edge at one end away from the fastened plate 610. In this case, along a distribution direction of the first camera 400 and the second camera 500, a ratio of a size of the flange edge to a size of the flat structure is not less than 2. The size of the flange edge is an extended width size of the flange edge, and the size of the flat structure is a thickness size of the flat structure. In some embodiments, at low temperature, the support plate 620 is in the flat shape. In this case, the support plate 620 may be regarded as a material thickness, and a gap M between the first camera 400 and the second camera 500 is slightly larger than the material thickness. Accordingly, a minimum length of a notch screen can be ensured, and a support structure can be disposed between the main board support 100 and the main board upper-cover 200. At high temperature, one end, away from the fastened plate 610, of the support plate 620 is bent to form the flange edge. In this case, the size of the flange edge is not less than two material thicknesses, such as two material thicknesses or three material thicknesses, to increase the contact area with the first support part 210 and improve a support effect.

To prevent the support plate 620 from forming a relatively large gap with the first support part 210 after the support plate is bent at high temperature, in this embodiment of this application, there is a slight overlapping region between an end, away from the fastened plate 610, of the support plate 620 at low temperature and the first support part 210, as shown in FIG. 3. In some embodiments, at low temperature, the support plate 620 is in a flat shape. In this case, if the main board support 100 connected to the support member 600 is assembled to the main board upper-cover 200, the end, away from the fastened plate 610, of the support plate 620 abuts against the first support part 210, so that the support member 600 is slightly lifted, that is, the support plate 620 has some redundancy. At high temperature, bending of the support plate 620 will shorten a total length of the support plate 620. Because the support plate 620 in a flat shape has some redundancy relative to the first support part 210, even if the support plate 620 is bent, a flange edge formed after bending can also abut against the first support part 210, so that it can be prevented that no support effect can be generated because of a relatively large gap.

In a specific implementation, the main board support 100 is made of stainless steel. In some embodiments, the main board support 100 is made of a SUS304 3/4H material with good corrosion resistance and sufficient hardness and strength, to support and protect the first camera 400 and the second camera 500. Further, the main board support 100 is formed by stainless steel in-mold injection molding, that is, stainless steel stamping and plastic mold injection molding. Definitely, considering that the fastened plate 610 and the main board support 100 are fastened by welding, a region on the main board support 100 configured to be connected to the fastened plate 610 in a fastening manner is made of stainless steel, thereby ensuring fastened connection by spot welding between the fastened plate 610 and the main board support 100.

Figure 5:
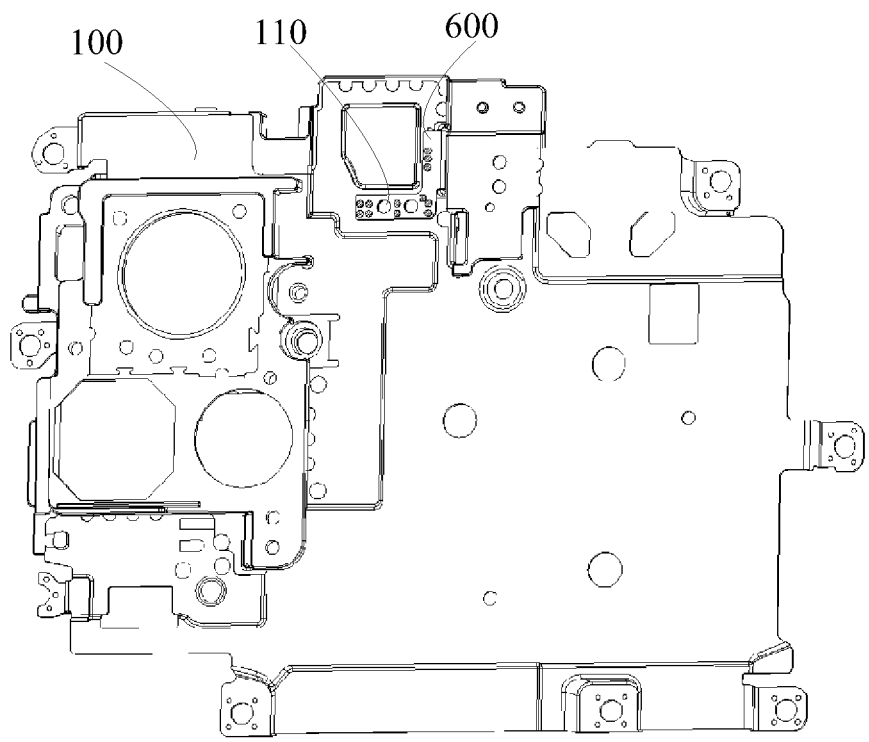
FIG. 5 is a front perspective view of assembly of a support member and a main board support in an electronic device disclosed according to an embodiment of this application.
Figure 6:
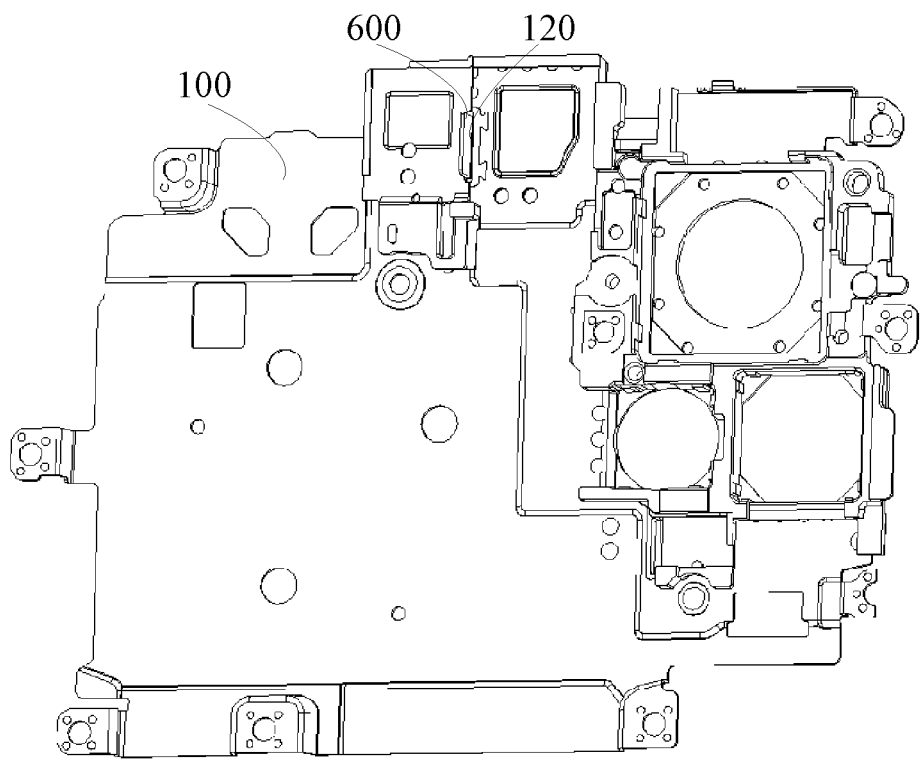
FIG. 6 is a back perspective view of assembly of a support member and a main board support in an electronic device disclosed according to an embodiment of this application.

In a specific implementation, the fastened plate 610 of the support member 600 is connected to a side surface, away from the main board upper-cover 200, of the main board support 100 in a fastening manner. To enable the support plate 620 to penetrate into the gap M, a through hole 120 is provided in the main board support 100. The support plate 620 can penetrate through the through hole 120 and extend into the gap M, so that an end, away from the fastened plate 610, of the support plate 620 can abut against the first support part 210, as shown in FIG. 5 and FIG. 6.

Understandably, in another embodiment, the support member 600 may also be connected to a side, facing the main board upper-cover 200, of the main board support 100. In this case, the support member 600 is located, relative to the main board support 100, on a same side of the main board support 100 with the gap M, so that actual assembly requirements can be satisfied without providing the through hole 120 in the main board support 100.

In an optional implementation, the main board upper-cover 200 further has a third support part 220 and a fourth support part 230 respectively disposed on a left side and a right side of the main board upper-cover 200. The third support part 220 and the first support part 210 are located on two sides of the first camera 400. The two sides of the first camera 400 are limited by the third support part 220 and the first support part 210. The first camera 400 is supported and mounted in combination with the main board support 100 and the main board upper-cover 200. The fourth support part 230 and the first support part 210 are located on two sides of the second camera 500. The two sides of the second camera 500 are limited by the fourth support part 230 and the first support part 210. The second camera 500 is supported and mounted in combination with the main board support 100 and the main board upper-cover 200. In addition, one side of the main board support 100 is supported on a main board 300. The main board 300 is supported on the third support part 220. The other side of the main board support 100 is supported on the fourth support part 230. A middle part of the main board support 100 is supported on the first support part 210 through the support member 600. In this manner, the main board support 100 is supported by the main board upper-cover 200, the main board 300, and the support member 600, thus effectively preventing a front camera from being damaged when the front camera module is squeezed after the main board support 100 is subject to a force, and ensuring normal use of the front camera module.

In an optional implementation, a battery cover 700 is disposed on a side, away from the main board upper-cover 200, of the main board support 100. The battery cover 700 is a plate member with relatively weak strength, is soft and easy to deform, and is pasted to a main board lower-cover. When the battery cover 700 is subject to an external force, due to weak strength and relatively large deformation, the force is directly transmitted to the main board support 100, to the support member 600 through the main board support 100, and to the main board upper-cover 200 through the support member 600, so that the force is not transmitted to the first camera 400 or the second camera 500, thus ensuring that the first camera 400 and the second camera 500 are not damaged.

An embodiment of this application discloses a method for mounting the support member 600 in the electronic device. The method includes:

fastening the support member 600 to a main board support 100;

cooling the support member 600 to a first preset temperature, so that a support region of the support member 600 is in a flat shape;

assembling the main board support 100 to a main board upper-cover 200, so that the support region of the support member 600 penetrates into a gap M; and heating the support member 600 to a second preset temperature, so that the support region of the support member 600 is deformed to form a second support part 630, and the second support part 630 abuts against a first support part 210.

In some embodiments, a positioning hole 611 in a fastened plate 610 is sleeved on a positioning protrusion 110 on the main board support 100, and then spot welding is performed to fasten the support member 600 on the main board support 100.

To cool the support member 600, the support member 600 can be placed in liquid nitrogen or a low temperature can be transferred to the support member 600 by contacting a cold source, so as to decrease a temperature of the support member 600 to a first preset temperature and enable the support member 600 to be in a low-temperature phase. In this case, a support region of the support member 600 is in a first shape, that is, the flat shape, to prepare for subsequent assembly. The first preset temperature may be determined according to a type of a selected shape memory alloy. For example, when a nickel-titanium shape memory alloy is selected, the first preset temperature is about −15° C., to ensure that the support region of the support member 600 is in the flat shape before assembly.

When the support region of the support member 600 is in the flat shape, the main board support 100 connected to the support member 600 is assembled to the main board upper-cover 200. During assembly, because the support region of the support member 600 is in the flat shape, the support region can smoothly penetrate into a relatively narrow gap M formed between the first camera 400 and the second camera 500, effectively preventing the support member 600 from colliding with a side wall of the first camera 400 or a side wall of the second camera 500, and achieving a good assembly effect.

When the support region of the support member 600 penetrates into the gap M between the first camera 400 and the second camera 500, the support member 600 is heated, so that a high temperature can be transferred to the support member 600 by contacting with a heat source, to enable a temperature of the support member 600 to be increased to a second preset temperature and enable the support member 600 to be in a high-temperature phase. In this case, the support region of the support member 600 is in a second shape, that is, is bent and deformed to form the second support part 630. The support region of the support member 600 in a bent shape abuts against the first support part 210. Therefore, a contact area between the support member 600 and the first support part 210 is increased, and a good support effect is achieved. The second preset temperature may be determined according to a type of a selected shape memory alloy. For example, when the nickel-titanium shape memory alloy is selected, the second preset temperature is 30° C. to 55° C., to increase the contact area between the support member 600 and the first support part 210 supporting an upper cover after assembly and improve support stability.

To sum up, in the embodiments of this application, the support member 600 is at least partially made of the shape memory alloy. A shape of the shape memory alloy can change at different temperatures to achieve different effects.

At low temperature, the support region of the support member 600 connected to the main board support 100 is in the shape for a low-temperature phase, with a relatively small thickness. Accordingly, a good assembly effect can be achieved in a case of a relatively narrow gap between the first camera 400 and the second camera 500. At normal temperature or high temperature, the support area of the support member 600 connected to the main board support 100 is in a shape for a high-temperature phase, so that a thickness of the support member 600 is relatively large. Therefore, the contact area with the first support part 210 supporting the upper cover is increased, and an accumulated tolerance formed by fastening and an accumulated tolerance formed by assembling the support member 600 are eliminated. Accordingly, a good support effect is achieved in a case of a relatively narrow gap between the first camera 400 and the second camera 500.

The electronic device in the embodiments of this application includes a mobile phone, a tablet computer, and the like, and a specific type is not limited.

The embodiments of this application mainly describe differences between the embodiments, and different optimization features among the embodiments can be combined to form a better embodiment as long as they are not contradictory. Considering the brevity of writing, details are not described herein.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An electronic device, comprising: a main board support (100), a main board upper-cover (200), a first camera (400), and a second camera (500), wherein
    a cavity is enclosed between the main board support (100) and the main board upper-cover (200), the first camera (400) and the second camera (500) are both disposed in the cavity, and a gap (M) is formed between the first camera (400) and the second camera (500);
    the main board upper-cover (200) has a first support part (210), the first support part (210) is located between the first camera (400) and the second camera (500) and extends toward the gap (M);
    the electronic device further comprises a support member (600), wherein the support member (600) is connected to the main board support (100), at least a part, away from the main board support (100), of the support member (600) is made of a shape memory alloy, and at least the part, away from the main board support (100), of the support member (600) is deformable between a first shape and a second shape, wherein in the first shape, at least the part, away from the main board support (100), of the support member (600) is located in the gap (M), in the second shape, at least the part, away from the main board support (100), of the support member (600) forms a second support part (630), and the second support part (630) abuts against the first support part (210), and along a distribution direction of the first camera (400) and the second camera (500), a size of the second support part (630) is larger than that of the gap (M).

2. The electronic device according to claim 1, wherein the support member (600) comprises a fastened plate (610) and a support plate (620), the fastened plate (610) and the support plate (620) are integrally disposed or connected to each other, and the fastened plate (610) is disposed at an angle with the support plate (620); and
    the fastened plate (610) is connected to the main board support (100) in a fastening manner, the support plate (620) extends into the gap (M), and the second support part (630) is located at one end, away from the fastened plate (610), of the support plate (620).

3. The electronic device according to claim 2, wherein the support plate (620) is made of a shape memory alloy; and
    the end, away from the fastened plate (610), of the support plate (620) has a flat plate structure in the first shape, and is deformed in the second shape to form a flange edge, so that the support plate (620) is L-shaped.

4. The electronic device according to claim 3, wherein along the distribution direction of the first camera (400) and the second camera (500), a ratio of a size of the flange edge to a size of the flat plate structure is not less than 2.

5. The electronic device according to claim 3, wherein in the first shape, the end, away from the fastened plate (610), of the support plate (620) partially overlaps the first support part (210).

6. The electronic device according to claim 2, wherein a side surface, away from the main board upper-cover (200), of the main board support (100) is provided with a positioning protrusion (110), the fastened plate (610) is provided with a positioning hole (611), and the positioning hole (611) is adapted to be sleeved on the positioning protrusion (110); and/or
    the fastened plate (610) is welded to the main board support (100).

7. The electronic device according to claim 6, wherein the main board support (100) is made of a SUS304 3/4H material;
    the main board support (100) is formed by stainless steel in-mold injection molding; and/or
    a region, in which the fastened plate (610) is fastened, of the main board support (100) is made of stainless steel.

8. The electronic device according to claim 6, wherein the main board support (100) is provided with a through hole (120), and the support plate (620) is adapted to penetrate the through hole (120) and extend into the gap (M).

9. The electronic device according to claim 1, wherein the support member (600) is at least partially made of a shape memory alloy with a two-way shape memory effect.

10. The electronic device according to claim 9, wherein a temperature range for phase transformation of the shape memory alloy is −30° C. to 80° C.

11. The electronic device according to claim 10, wherein the shape memory alloy is a nickel-titanium shape memory alloy.

12. The electronic device according to claim 1, wherein the main board upper-cover (200) further has a third support part (220) disposed on a side, away from the first support part (210), of the first camera (400) and a fourth support part (230) disposed on a side, away from the first support part (210), of the second camera (500); and
    the electronic device further comprises a main board (300), the main board (300) is supported on the third support part (220), one side of the main board support (100) is supported on the main board (300), and the other side is supported on the fourth support part (230).

13. The electronic device according to claim 2, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

14. The electronic device according to claim 3, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

15. The electronic device according to claim 4, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

16. The electronic device according to claim 5, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

17. The electronic device according to claim 6, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

18. The electronic device according to claim 7, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

19. The electronic device according to claim 8, wherein the main board upper-cover (200) further has a third support part (220) disposed on a side, away from the first support part (210), of the first camera (400) and a fourth support part (230) disposed on a side, away from the first support part (210), of the second camera (500); and the electronic device further comprises a main board (300), the main board (300) is supported on the third support part (220), one side of the main board support (100) is supported on the main board (300), and the other side is supported on the fourth support part (230).

20. A method for mounting a support member of an electronic device, wherein the electronic device comprises: a main board support (100), a main board upper-cover (200), a first camera (400), and a second camera (500), wherein a cavity is enclosed between the main board support (100) and the main board upper-cover (200), the first camera (400) and the second camera (500) are both disposed in the cavity, and a gap (M) is formed between the first camera (400) and the second camera (500);

the main board upper-cover (200) has a first support part (210), the first support part (210) is located between the first camera (400) and the second camera (500) and extends toward the gap (M);

the electronic device further comprises a support member (600), wherein the support member (600) is connected to the main board support (100), at least a part, away from the main board support (100), of the support member (600) is made of a shape memory alloy, and at least the part, away from the main board support (100), of the support member (600) is deformable between a first shape and a second shape, wherein in the first shape, at least the part, away from the main board support (100), of the support member (600) is located in the gap (M), in the second shape, at least the part, away from the main board support (100), of the support member (600) forms a second support part (630), and the second support part (630) abuts against the first support part (210), and along a distribution direction of the first camera (400) and the second camera (500), a size of the second support part (630) is larger than that of the gap (M); and the method comprises:

fastening the support member (600) to the main board support (100);

cooling the support member (600) to a first preset temperature, so that a support region of the support member (600) is in a flat shape;

assembling the main board support (100) to the main board upper-cover (200), and extending the support region of the support member (600) into the gap (M); and heating the support member (600) to a second preset temperature, so that the support region of the support member (600) is deformed to form the second support part (630), and the second support part (630) abuts against the first support part (210).

\* \* \* \* \*